United States Patent [19]

Kuo et al.

[11] Patent Number: 5,250,905
[45] Date of Patent: Oct. 5, 1993

[54] BATTERY WITH ELECTROCHEMICAL TESTER

[75] Inventors: Han C. Kuo, Burlington; Ignacio Chi, Dracut, both of Mass.; Frederick A. Kulik, Atkinson, N.H.

[73] Assignee: Duracell Inc., Bethel, Conn.

[21] Appl. No.: 764,610

[22] Filed: Sep. 24, 1991

[51] Int. Cl.$^5$ .................................. G01N 27/416
[52] U.S. Cl. ........................... 324/435; 324/426; 340/636; 320/48; 429/91
[58] Field of Search ............... 324/426, 435, 437, 104; 340/636; 320/48; 429/90, 91, 92, 93

[56] References Cited

U.S. PATENT DOCUMENTS

| | | | |
|---|---|---|---|
| 1,497,388 | 6/1924 | Sterling. | |
| 2,980,754 | 4/1961 | Reilly et al. | 136/182 |
| 3,209,255 | 9/1965 | Estes et al. | 324/94 |
| 3,289,677 | 12/1966 | Hewlett, Jr. | 324/94 |
| 3,344,343 | 9/1967 | John | 324/94 |
| 3,514,338 | 5/1970 | Shakour | 136/102 |
| 3,563,806 | 2/1971 | Hruden | 136/112 |
| 3,773,563 | 11/1973 | Eaton, Jr. et al. | 136/182 |
| 3,992,228 | 11/1976 | Depoix | 429/90 |
| 4,048,388 | 9/1977 | Chevet | 429/91 |
| 4,112,361 | 9/1978 | Nakada et al. | 324/92 |
| 4,497,881 | 2/1985 | Bertolino | 429/91 |
| 4,723,656 | 2/1988 | Kiernan et al. | 429/93 X |
| 5,015,544 | 5/1991 | Burroughs et al. | 429/93 |
| 5,059,895 | 10/1991 | Cataldi et al. | 324/104 |

FOREIGN PATENT DOCUMENTS 3331360 3/1985 Fed. Rep. of Germany.

Primary Examiner—Kenneth A. Wieder
Assistant Examiner—Glenn W. Brown
Attorney, Agent, or Firm—Ronald S. Cornell; James B. McVeigh; Barry D. Josephs

[57] ABSTRACT

An electrochemical cell is provided with an integrally related state of charge indicator comprising an electrochemically generated display. The state of charge indicator comprises two electrical contacts and an electrochemically generated display connected therebetween. The display comprises an electrochemical cell that is permanently connected to the cell in a parallel configuration via the contacts. The condition of the cell is thus continuously displayed.

18 Claims, 1 Drawing Sheet

BATTERY WITH ELECTROCHEMICAL TESTER

This invention relates to an improved combination of an electrochemical cell and an integrally related battery condition indicator comprising an electrochemically generated display.

Electrical primary cells which include a means for visually indicating the condition or state of charge of the cell are known. The known indication means include, but are not limited to, chemical indicators which react with materials inside the battery, chemical indicators located externally to the battery, elements embedded within an electrode that become visible during discharge, and thermochromic materials in thermal contact with a resistive element that is adapted to be connected across the battery. A problem with many of these indicators is the timing of their indication is sensitive to the construction geometry of the indicator on or within the battery. Therefore, natural variations which inherently occur during manufacture lead to variability, from battery to battery, in the time during discharge when the indication occurs.

A preferred battery tester is one which measures the voltage of a battery since a voltage measurement per se is not sensitive to construction geometry. One type of tester which provides an indication that is proportional to voltage comprises a thermochromic material in thermal contact with a resistive element. Non-limiting examples of such testers are disclosed in U.S. Pat. Nos. 4,835,476, 4,726,661, 4,835,475, 4,702,563, 4,702,564, 4,737,020, 4,006,414, 4,723,656, and 5,128,616. These testers work well for intermittent testing of a battery during its useful life. They are more difficult to permanently attach to a battery because the visual indicator is a thermochromic material. Care must be taken to thermally insulate the indicator from the battery casing in order to prevent heat transfer that would interfere with proper operation of the indicator. Additionally, these testers comprise a resistor that is connected in series with the battery during the voltage measurement. Therefore, the electrical contacts of the tester can not be permanently attached to the battery terminals in the absence of a switch, otherwise, the battery would be prematurely discharged through the tester.

The present invention overcomes the problems associated with the above described testers by employing a battery tester comprising an electrochemically generated display that is permanently electrically connected in parallel to the battery. Heat transfer is not an issue because the principle of operation is electrochemical, not thermochromic. Premature discharge is not a problem because the electrochemical tester is connected in parallel to the battery and therefore, can not act as a series resistor. The voltage of the electrochemical cell which generates the display follows the voltage of the battery during discharge and thereby provides an accurate determination of the useful life remaining in the battery.

In particular, the present invention relates to an electrochemical cell comprising a container and a top and an integrally related state of charge indicator positioned externally both to said cell top and said container. The state of charge indicator has two electrical contacts and an electrochemically generated display connected therebetween. A first contact is permanently connected to a first cell terminal and a second contact is permanently connected to the other terminal. The indicator is so designed that no part thereof is positioned where it could interfere with insertion of the battery in a device such as would be the case if wires or tabs were associated therewith for connecting terminals at one or both ends of a cell, and the addition of chemicals in order to operate is not required.

In one embodiment the indicator is integrally related to the cell label. In a second embodiment the condition indicator is located between the cell top and an opposing end cap.

The features and advantages of the present invention are discussed below in reference to the drawings in which.

Figure 2:
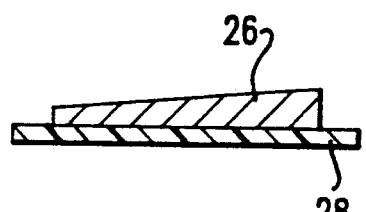
FIG. 2 shows an alternate embodiment of the anode layer in cross section for the indicator cell.
Figure 3:
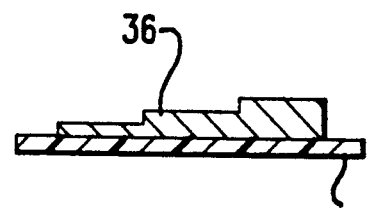
Figure 5:
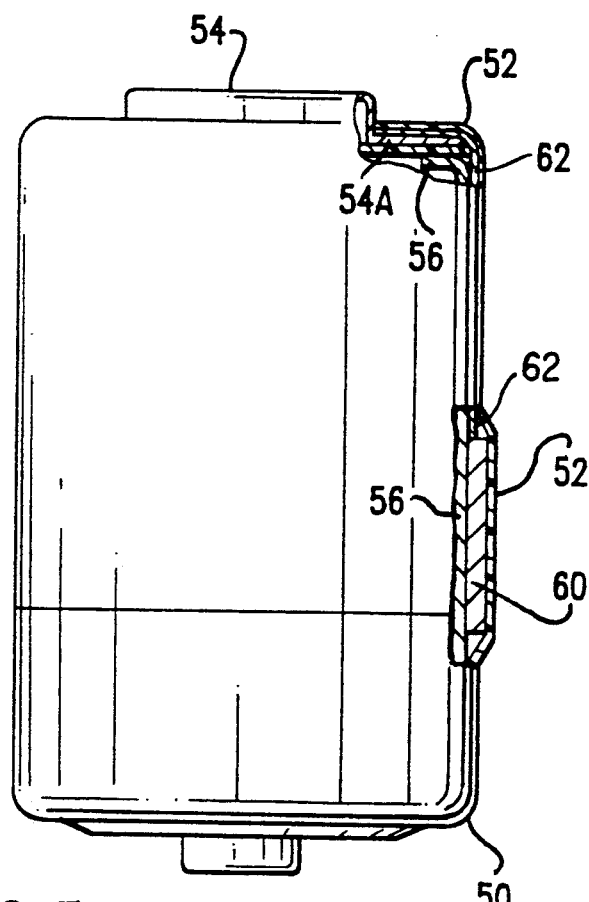
Figure 4:
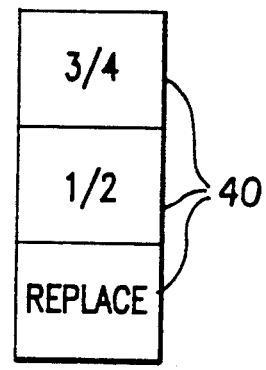

FIG. 3 another alternate embodiment of the anode layer in cross section for the indicator cell;

FIG. 4 shows an indicia layer to be used with the anodes shown in FIGS. 2 and 3; and FIG. 5 shows a battery having a permanently connected condition indicator in accordance with the present invention.

For purposes of the following discussion the electrochemical cell that is being measured will be referred to as the "main cell" and the electrochemical cell that generates the display will be called the "indicator cell". In accordance with the present invention, an integrally related battery and condition indicator is constructed by permanently connecting a condition indicator comprising an indicator cell, comprising a pair of electrodes, in a parallel configuration with the main cell. The indicator cell indicates the condition of the main cell using an electrochemically generated display that is constructed as follows.

A cathode active material and an anode active material are selected for the indicator cell which have a voltage that is less than or equal to the voltage of the main cell. This ensures that the indicator cell will be discharged only when the main cell is also being discharged. In one embodiment the anode and the cathode of the indicator cell are selected to be the same as the anode and the cathode of the main cell, e.g. zinc and manganese dioxide. However, an anode and cathode couple different from the main cell can also be used, provided that the voltage of the indicator cell is such that it will at least begin to discharge before the main cell voltage drops to a value that is no longer useful. Otherwise, the indicator cell would not be discharged and a display would not be generated before the end of the useful life of the main cell.

As discussed further below, the capacity of the indicator cell is much less than the capacity of the main cell. For example, the capacity of the indicator cell can be as low as 1/1000 of the capacity of the main cell. Therefore, it is preferred that the impedance of the indicator cell is at least 10 times, more preferably at least 100 times, and most preferably 1000 times the impedance of the main cell. A high impedance will cause the indicator cell to discharge at a lower rate than the main cell so that the discharge of the indicator cell is timed to coincide with the time corresponding to the useful discharge of the main cell. In fact, the impedance of the indicator cell can be specifically tailored by adding a resistor in series so that the combination of the indicator cell and resistor causes the indicator cell to discharge at a predetermined rate that is proportional to the rate of discharge of the main cell.

The electrolyte for the indicator cell is preferably viscous, such as a gel or a conductive polymer, and more preferably is a solid. Liquid electrolytes are less desirable because they are difficult to contain and they can dry out. A solid electrolyte simplifies the construction of the indicator cell because a simple layered construction, discussed further below, is possible. Solid electrolytes are well known and it is within the skill of the artisan to select an electrolyte that is appropriate for the anode and cathode chosen for the indicator cell. A preferred class of solid electrolytes includes sheet silicate intercalates, non-limiting examples of which includes kaolite, montmorillonite, illite, chlorite, and vermiculate. Of these montmorillonite is more preferred. Montmorillonite has the following general composition:

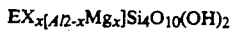

where "Ex" represents an exchangeable cation. In a preferred embodiment "Ex" is the cation of the anode metal chosen for the indicator cell. The raw montmorillonite material is converted to the appropriate anode cation form by saturating the montmorillonite with a salt of the anode metal cation. Non-limiting examples of the anion of the anode metal salt include chloride, sulphate, and nitrate. Of these, sulphate and nitrate are preferred. Discharge of the indicator cell having the above described electrolyte results in the anode being oxidized to its corresponding cation and the cation migrating through the electrolyte to the cathode. The net result is that the anode is electrochemically removed, i.e. it disappears as the main cell is discharged. Thus, the extent of the discharge of the main cell is determined by observing the disappearance of the indicator cell anode.

The preferred indicator cell is one in which the anode disappears as described above. The display is completed by including an indicia bearing layer beneath the anode layer. The indicia can be of any type which will convey a message to the observer. It could be a color, such a red, or it could be a written message, such as "Replace", and the like. The amount of anode metal in the indicator cell is chosen so that enough metal is removed to reveal the indicia at a time when the main cell is approaching the end of its useful life.

The indicator cell is preferably made very thin so that it can be permanently attached to an external surface of the main cell without substantially adding to the dimensions of the main cell. A layered construction for the indicator cell can result in a cell that is about 10 mils thick. Such a cell comprises a thin cathode layer covered by a thin solid electrolyte layer. The indicia layer is printed directly onto the solid electrolyte layer and a thin anode layer is superimposed over the indicia bearing layer. Thin metal foil strips, or the like, are used to connect the cathode to the positive terminal of the main cell and the anode to the negative terminal of the main cell. The anode layer is visible from the outside through either a transparent portion of the main cell label that is juxtaposed to the indicator cell or through a clear substrate that covers the outer surface of the indicator cell anode. Specific embodiments are discussed further below.

The features and advantages of the present invention will now be discussed in connection with a specific embodiment and making reference to the drawings. A condition indicator comprising an electrochemically generated display for a "AA" size zinc/manganese dioxide alkaline cell is constructed as follows. All parts are parts by weight unless indicated otherwise.

A solid electrolyte comprising a zinc cation containing montmorillonite is prepared by adding about "250" parts of a 1 molar $ZnSO_4$ aqueous solution to 20 parts of montmorillonite. The mixture is stirred while heating until it boils and then it is placed into an oven set at 60%–70% C. for 3–4 hours. After this time period the liquid is decanted off and fresh $ZnSO_4$ solution is added as described above. The mixture is stirred, heated, and stored as described above and the process is repeated an additional 3–4 times. Following the final $ZnSO_4$ treatment the resulting Zn-montmorillonite is washed several times with distilled water and dried at 75°–85°.

Figure 1A:
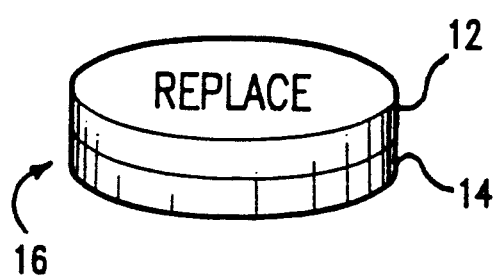
FIG. 1A shows an electrolyte/cathode pellet for the indicator cell made in accordance with the present invention.

A cathode mixture is prepared by mixing 65 parts manganese dioxide powder, 30% of Zn-montmorillonite powder prepared as described above, and 5% polytetrafluoroethylene powder. A pellet comprising a layer of the solid electrolyte and a layer of the cathode mixture, such as shown in FIG. 1A is prepared as follows. 200 mg of the Zn-montmorillonite is added to a round mold cavity diameter being about 0.5 in) having a flat bottom. A closely fitting mold die having a flat surface is inserted into the cavity and manually pressed down to flatten the electrolyte layer 12. The mold die is removed and 200 mg of the cathode mixture is placed evenly over the electrolyte layer. The mold die is re-inserted and then pressed in a press at a pressure of 5000 psi. The resulting electrolyte/cathode pellet is about 40 mils (1 mm) thick and is comprised on a compressed electrolyte layer 12 and a compressed cathode layer 14.

A zinc anode is preferably prepared by electrochemically plating zinc metal onto a clear conductive substrate. An example of a clear conductive substrate is a polyester film having a coating of indium tin oxide coated thereon, such as that designated as Altair M-5 (manufactured by Southwall Technology Inc., Palo Alto, Calif.). A rectangular piece of this film is plated with zinc using a current density of 1 milliamp/$cm^2$ for 20 minutes in a plating bath comprising 0.5 molar $H_2SO_4$ and 0.25 molar ZnO. The capacity of the zinc anode is less than the realizable capacity of the cathode so that substantially all of the zinc will disappear when the cell is fully discharged.

Figure 1B:
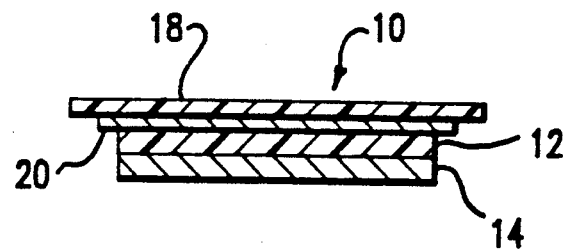
FIG. 1B shows an indicator cell in cross section.

Referring now to FIGS. 1A and 1B, indicator cell 10 is assembled as follows. The word "Replace" is written in ink on the exposed side of solid electrolyte layer 12 of the electrolyte/cathode pellet 16. A section of polyester film 18 having zinc layer 20 plated thereon is held with zinc layer 20 against electrolyte layer 12. The zinc preferably covers the entire surface area of electrolyte layer 12. The zinc layer can extend beyond the surface area of the electrolyte layer, which extending portion can function as at least part of the electrical pathway for connecting the indicator cell anode to the negative terminal of the battery. The completed cell has an impedance of between about 500 and 1000 ohms. The zinc anode of the indicator cell is electrically connected to the negative terminal of a "AA" size zinc/manganese dioxide alkaline cell and the cathode is electrically connected to the positive terminal of said "AA" size cell. A resistive load is connected across the terminals of the battery. As the battery approaches the end of its useful life the zinc indicator cell anode disappears revealing the word replace.

In contrast to the single event indicator described above the indicator cell can be designed in a manner so that it functions as a "fuel gauge". FIGS. 2 and 3 show cross section of indicator cell anode 26 deposited on film 28 and anode 36 deposited on film 38 having an increasing thickness from one end to the other. Such an anode would first disappear at its thin end and the thickest end would disappear last. An indicia layer 40 imprinted on a rectangular solid electrolyte/cathode pellet such as that shown in FIG. 4 would be used with the thinnest portion of anode 26 or 36 superimposed over the portion marked "¾" and the thickest portion over the word "Replace". When such an indicator cell is permanently connected to a battery the user is provided with a continuous indication of the state of charge of the battery in the same manner as the fuel gauge on a car. An alternative, but less preferred embodiment for achieving the "fuel gauge" effect is to vary the thickness of the cathode layer (similar to the anodes shown in FIGS. 2 and 3) while keeping the anode layer thickness substantially uniform.

FIG. 5 shows an embodiment of an indicator cell 60 permanently connected to battery 50. In a preferred embodiment indicator cell anode 62 is printed, electrodeposited, or otherwise fixed to the inside surface of cell label 52. Indicator cell 60 is comprised of anode, solid electrolyte, and cathode layers such as shown in FIG. 1B. Label 52 firmly holds the indicator against cell casing 56 with the cathode layer electrically connected to casing 56 and the electrolyte layer physically contacting the anode layer. Conductive element 62 is connected to the anode layer and extends upwardly along cell casing 56 outer wall underneath label 52. At the upper end of cell 50 label 52 is formed over negative end cap 54. Conductive element 62 contacts the outer periphery 54A of end cap 54 as shown whereby the anode of indicator cell 60 is permanently connected to the negative terminal of the cell. Conductive element 62 can be an extension of the deposited anode layer as described above or it can be a different conductive material that is fixed to the inside surface of the label. An electrically insulating layer (not shown) must also be interposed between conductive element 62 and casing wall 56 otherwise the indicator cell and battery would be short circuited.

The embodiments described above are for illustrative purposes only. The specific design of the condition indicator cell will depend, of course, on the size and voltage of the associated battery. Other embodiments for fixing the indicator cell to the battery are, of course, possible and are intended to be within the scope of the present invention. Other anodes, cathodes, and electrolytes than those specifically described can also be used for the indicator cell and are intended to be within the scope of the present invention as claimed.

What is claimed is:

1. In combination, a battery and a battery condition indicator wherein said indicator comprises an electrochemical cell comprising a pair of electrodes, said cell being permanently electrically connected in parallel to the battery with at least one of said electrodes of said indicator being visible, whereby the condition of the battery is determined by observing a change in said visible electrode.

2. The combination of claim 1 wherein said cell has a voltage less than or equal to said battery.

3. The combination of claim 1 wherein said cell has an impedance of at least 100 times the impedance of the battery.

4. The combination of claim 1 wherein said cell has an impedance of at least 1000 times the impedance of the battery.

5. In combination, an electrochemical cell and a cell condition indicator; said electrochemical cell comprising a container, a negative terminal and a positive terminal; said condition indicator operating by having electrochemical activity occur therein in parallel with electrochemical activity in said cell, and said indicator being positioned externally to said cell; said indicator comprising a first electrically conductive means which is mechanically and electrically connected to one of said terminals to provide permanent electrical continuity therewith, a second electrically conductive means which is mechanically and electrically connected to the other of said terminals to provide permanent electrical continuity therewith, and a display means connected between said first and second electrically conductive means, whereby electrochemical activity within the display means causes the condition of said cell to be displayed.

6. The combination of claim 5 wherein said display means comprises a visible, electrochemically removable, layer superimposed over an indicia bearing layer.

7. The combination of claim 5 wherein said cell further comprises an outer label and said condition indicator is located on the inside surface of a clear portion of said label.

8. The combination of claim 5 and wherein every part of the condition indicator substantially conforms to the shape of that portion of the outer surface of the cell which is adjacent thereto.

9. The combination of claim 5 wherein said display means is positioned along a portion of the outer container wall and further comprising a label wrapped around the container wherein a transparent portion of said label covers said display means.

10. The combination of claim 5 wherein said second terminal comprises a circular metal end cap positioned over the cell top and said first electrically conductive means is connected to said end cap and said second electrically conductive means is connected to a portion of said container.

11. The combination of claim 5, wherein said cell further comprises an outer label and said label holds said first and second electrically conductive means in mechanical and electrical contact with said terminals.

12. The combination of claim 5 wherein said display means comprises a cathode active layer electrically connected to the positive terminal of the battery, an anode active layer juxtaposed to said cathode active layer and electrically connected to the negative terminal of the battery, an electrolyte layer located between said cathode and anode active layers, and an indicia bearing layer located between said cathode and anode active layers; wherein said indicia layer is revealed during discharge of the battery to indicate the condition of the battery.

13. The combination of claim 12 wherein said anode has an increasing thickness from one end portion to an opposite end portion.

14. The combination of claim 12 wherein said cathode active layer comprises manganese dioxide and said anode active layer comprises zinc.

15. The combination of claim 14 wherein said electrolyte is a solid and said indicia bearing layer is located between said electrolyte and said anode.

16. The combination of claim 15 wherein said solid electrolyte comprises a sheet silicate saturated with a zinc salt.

17. The combination of claim 16 wherein said sheet silicate is montmorillonite and said zinc salt is selected from the group consisting of zinc sulphate and zinc nitrate.

18. In combination, an electrochemical cell and a condition indicator; said cell comprising a container, at least a portion of the outside surface of which forms a first external terminal for connection to a device to permit use of the electricity which is generated within said cell, a cell top which seals said container, means for conducting electricity from the inside of the sealed container and through said cell top to a second terminal which is also external to the sealed container, and a label located around the outside surface of the container and over a portion of said second terminal; wherein said condition indicator is integrally related to said label and comprises a first electrical contact portion permanently connected to one of said terminals, a second electrical contact portion permanently connected to the other terminal, and an electrochemically generated display means connected between said first and second contact portions.

* * * * *